United States Patent

Studtmann

[15] 3,638,042

[45] Jan. 25, 1972

[54] THYRISTOR WITH ADDED GATE AND FAST TURN-OFF CIRCUIT

[72] Inventor: George H. Studtmann, Mount Prospect, Ill.

[73] Assignee: Borg-Warner Corporation, Chicago, Ill.

[22] Filed: July 31, 1969

[21] Appl. No.: 846,395

[52] U.S. Cl. ............................307/252 G, 307/305, 317/235

[51] Int. Cl. ....................................H03k 17/00, H03k 17/56

[58] Field of Search ..................307/252.20, 252.22, 252.23, 307/252.26, 252.51, 252.55, 305; 317/235

[56] References Cited

UNITED STATES PATENTS

| | | | |
|---|---|---|---|
| 3,261,985 | 7/1966 | Somos | 307/88.5 |
| 3,307,049 | 2/1967 | Bernuth et al. | 307/252 X |
| 3,405,332 | 10/1968 | Svedberg et al. | 317/235 |
| 3,408,545 | 10/1968 | DeCecco et al. | 317/235 |
| 3,488,522 | 1/1970 | Cameron et al. | 307/252 |

*Primary Examiner*—Donald D. Forrer
*Assistant Examiner*—John Zazworsky
*Attorney*—Donald W. Banner, Williams S. McCurry and John W. Butcher

[57] ABSTRACT

A PNPN-thyristor has an extra gate connection added in the N-region adjacent the outer P-region. A pulse generator applies a turnoff control signal to the added gate when turnoff across the anode-cathode connections is initiated, to sweep out the carriers at the center junction rather than allow the carriers to normally recombine over a longer time period. The connection to the added gate can be extended in area, either in the operation by which the extra connection is added to a conventionally produced PNPN-thyristor, or by varying the manufacturing process by which the PNPN-thyristor is produced.

16 Claims, 16 Drawing Figures

Inventor
George H. Studtmann

By James J. Jennings, Jr.
Attorney

Inventor
George H. Studtmann
By James J. Jennings, Jr.
Attorney

Alloying-
Contact
Formation

Inventor
George H. Studtmann
By [signature]
Attorney

THYRISTOR WITH ADDED GATE AND FAST TURN-OFF CIRCUIT

BACKGROUND OF THE INVENTION

One known PNPN-type thyristor is a silicon-controlled rectifier (SCR) which includes an ohmic connection to the outer P-layer enabling it to function as an anode, a second ohmic connection to the outer N-layer enabling it to operate as the cathode, and a third ohmic connection to the P-layer adjacent the N-cathode layer to provide a normal gate connection. With the application of a unidirectional potential difference across the anode and cathode of the four-layer device, with the polarity at the anode being positive with respect to that at the cathode, and the injection of current into the normal gate lead in the P-layer adjacent the cathode, current flowing through the device rapidly increases into the high-conduction mode of the SCR. The normal gate then no longer has control over the conduction, and to turn off the SCR it is necessary to reduce the main current below the holding current level. Frequently this is done by reversing the polarity applied across the anode and cathode so that a reverse current actually flows through the SCR for a brief time, rapidly sweeping out the carriers from the end junctions adjacent the anode and cathode layers. One end junction is between the anode P-layer and the adjacent N-layer, and the other end junction is between the cathode N-layer and the adjacent P-layer of the normal gate. The reverse current flows as the holes and electrons in the end portions of the device diffuse to these two end junctions. After the holes and electrons at these junctions have been removed, the reverse current in the external circuit terminates and these two end junctions are in the blocking condition. However recovery of the SCR is not complete because there is still a high concentration of holes in the inner N-layer in the vicinity of the center junction. It has been general practice to allow these holes in the inner N-layer adjacent the center junction to recombine, at a rate generally independent of the conditions then applied in the circuit external to the SCR. After sufficient recombination has taken place, the concentration of holes near the center junction will decrease to a low value and this center junction will also regain its blocking state. At this time a forward voltage can be reapplied between the anode and cathode of the device without again gating the SCR on, provided of course there is no current injected into the normal gate at this time.

It is a main consideration of this invention to decrease the turnoff time of an SCR by shortening the time required for the center junction of the device to regain its blocking state.

SUMMARY OF THE INVENTION

The present invention includes a circuit for energizing and operating a thyristor comprised of a body with four alternate layers of N- and P-type semiconductor material. The first N-layer has an ohmic contact and functions as the cathode, and the first P-layer has an ohmic contact and functions as the normal gate, forming a first end junction with the first N-layer. The second N-layer includes an ohmic connection which enables it to function as an added or extra gate, and it forms a center junction with the first P-layer. The second P-layer includes an ohmic contact and functions as the anode, forming a second end junction with the second N-layer. Means including a pair of reference conductors is provided for applying a unidirectional potential difference between the ohmic contacts of the anode and cathode layers of the thyristor with the appropriate polarity to provide anode-cathode current flow through the unit responsive to the application of gate signals to the normal gate. A turnoff circuit is coupled to these reference conductors for at least temporarily overcoming the effect of the unidirectional potential difference, to turn off the thyristor. Such turnoff may include removal of the normal unidirectional potential difference, or reduction of the normal potential difference to substantially zero, or application of a reverse polarity potential difference across the anode-cathode connections.

Particularly in accordance with the present invention means is provided and coupled to the ohmic contact on the added gate of the thyristor for applying a control signal of the proper polarity to this added gate, to produce current flow across the center junction from the added gate (second N-layer) into the normal gate (first P-layer). Such action sweeps out the charge carriers in the vicinity of the center junction, which carriers would otherwise recombine over a considerably longer time period before the center junction regained its blocking state.

THE DRAWINGS

In the several figures of the drawings like reference numerals identify like elements, and in the drawings.

DETAILED DESCRIPTION OF THE INVENTION

Figure 1:
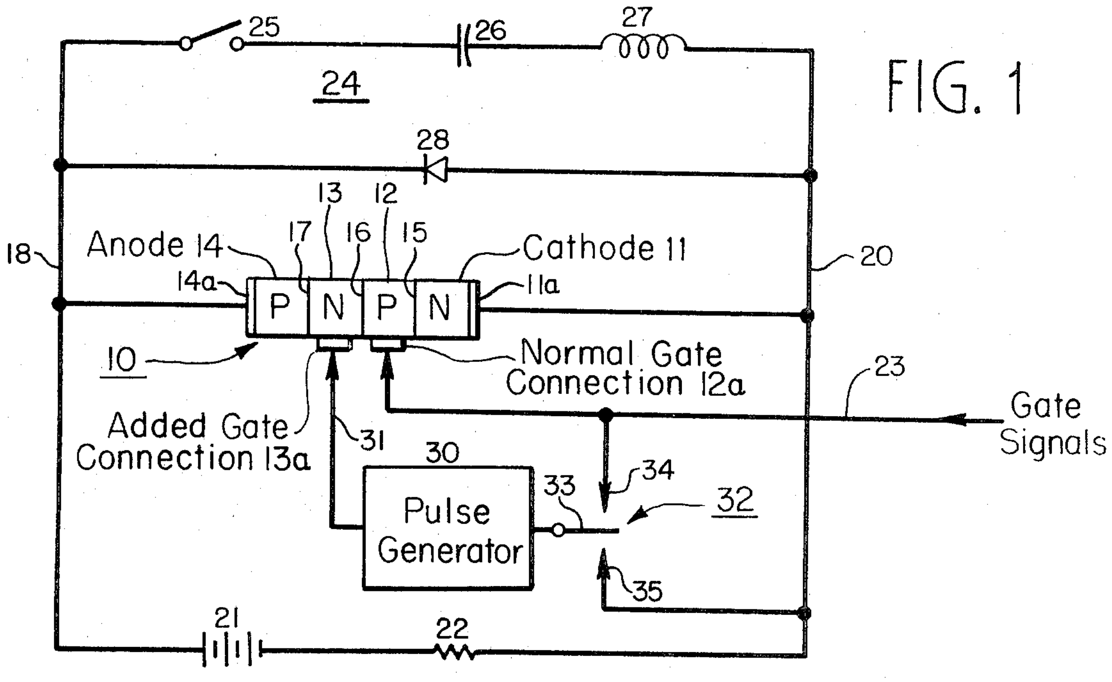
FIG. 1 is a schematic diagram, partly in block form, of a four-layer thyristor with an added gate and a turnoff circuit connected in accordance with this invention.

FIG. 1 depicts a control circuit according to this invention for energizing and operating a thyristor 10 which has a body semiconductor material, such as silicon or germanium. The thyristor which may be an SCR includes four alternate layers 11–14 of N- and P-type material. The first N-layer 11 has an ohmic contact **11*a* and functions as the cathode, and the first P-layer 12 includes an ohmic contact 12*a* which enables it to operate as the normal gate. A first end junction 15 is formed between the contiguous layers 11, 12. The second N-layer 13 includes an ohmic contact 13*a* which enables it to function as an added gate, and this N-layer 13 forms a center junction 16 with the first P-layer 12. The second P-layer 14 includes an ohmic contact 14*a* which enables it to operate as the anode, and it also forms a second end junction 17 with the second N-layer 13**.

A pair of reference conductors 18, 20 are coupled to anode connection **14*a* and cathode connection 11*a* of the SCR 10. In the illustrated circuit a battery 21 is coupled in series with a load resistor 22 between the reference conductors 18, 20 but it is apparent that any source of energy such as a rectifier circuit, fuel cell or other unit can be coupled between the reference conductors to supply operating energy to the SCR. Accordingly for purposes of this invention and the appended claims reference conductors 18, 20 are considered as means for applying a unidirectional potential difference between the anode and cathode layers of the SCR. With this arrangement, a gate signal comprising a current flow of appropriate polarity is provided from any suitable trigger source over conductor 23 to the normal gate connection 12*a* to gate the SCR on. In this explanation conductor 23 is considered the means for applying gating signals to normal gate layer 12**.

A turnoff circuit 24 is coupled between reference conductors 18, 20. The turnoff circuit includes a switch 25, a capacitor 26 and an inductor 27, all coupled in series between conductors 18 and 20, and a diode 28 coupled in parallel with this series circuit. This circuit operates in a well-known manner to at least temporarily overcome the effect of the energizing potential difference from the battery 21 to allow the anode-cathode load current through device 10 to decrease to zero. Of course this arrangement, or the application of a reverse bias potential difference between conductors 18, 20, will afford recovery of the two end junctions 15 and 17 in a relatively short time, but the center junction 16 is not reverse-biased and it takes a considerably longer time for the natural recombination of the holes in the N-layer 13 adjacent center junction 16 to run its course.

Particularly in accordance with the present invention means such as a pulse generator 30 is provided, and one side is coupled over a lead 31 to the added gate connection 13*a* of the SCR 10. The other side of pulse generator 30 is coupled to a switch unit 32, and specifically to the movable center contact 33 of this switch. Switch 32 also includes a first fixed contact 34 coupled to the conductor 23 which is attached to the normal gate connection 12*a*, and the switch includes a second fixed contact 35 coupled to reference conductor 20 and cathode connection 11*a*. When turnoff circuit 24 is actuated to effect rapid recovery of the end junctions 15 and 17, switch 32 is actuated to reverse bias the PN-junction 16 between layers 12 and 13, to effect rapid recovery and restore the blocking condition of this junction without waiting for the normal recombination of the charges in the area of center junction 16. If switch 32 is actuated by displacing contact 33 upwardly to engage fixed contact 34, a positive-going control signal applied over conductor 31 tends to cause current flow from the N-layer 13 across the junction 16 into the P-layer 12, to effect the rapid recovery of the junction 16. Likewise if movable contact 33 is displaced downwardly to engage fixed contact 35, the appropriate recovery pulse or control signal is still applied between added gate contact 13*a* and cathode contact 11*a*, tending to cause current flow across the junction 16 in the appropriate direction to produce the desired rapid recovery without waiting for the normal recombination process.

Figures 2, 3:
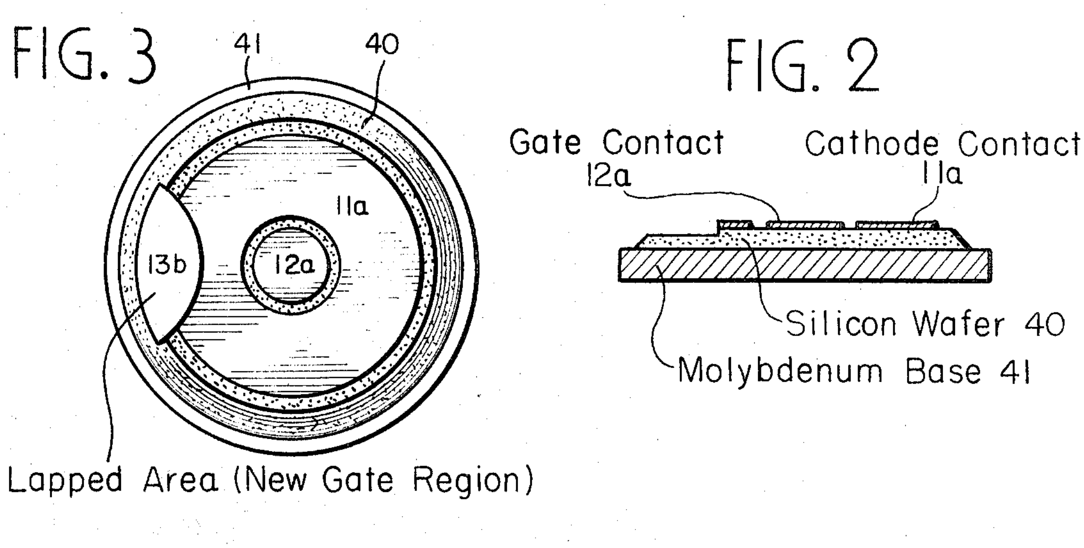
FIGS. 2 and 3 are side and top views, respectively, depicting the modification of a conventional SCR to operate in accordance with this invention.

FIG. 2 illustrates a commercially available SCR unit 10 which has been modified to receive the ohmic contact for the added gate. The unit 10 includes a silicon wafer or disc 40 which has the four layers of alternate P- and N-type semiconductor material spaced so closely that it is not practical to illustrate the separate layers on this scale. An annular contact 11*a* is provided and connected to the N-layer 11 which functions as the cathode, and a gate contact 12*a* is centrally located and connected to the P-layer which abuts the cathode layer. In general the anode connection (not shown) is made through a mounting stud or other unit supported at the base. A molybdenum base 41 is provided for support under the wafer, and frequently a similar molybdenum layer is added above the unit before final encapsulation or physical mounting is completed.

Figure 4:
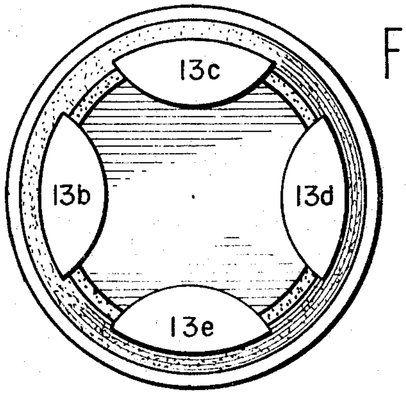
FIG. 4 is a top view of an alternate embodiment of the SCR modification for use in this circuit.

As shown the left portion of FIG. 2 and better illustrated in the top view of FIG. 3, the disc-shaped wafter 40 is lapped to provide an area 13*b* for receiving the added gate contact. This operation was accomplished utilizing commercially available Westinghouse 219D SCR's, and the modified SCR's with the additional gate contact operated satisfactorily with reduced turnoff time. It became apparent that the amount of additional turnoff current which would be forced into the SCR with a reasonable amount of voltage was limited by the transverse resistance in the N-region 13 of the added gate, as the additional turnoff current diffuses laterally outwardly from the additional gate contact 13*a*, in a ripple effect much like the ripples that spread outwardly in a pond when a stone is dropped adjacent one edge. To overcome this effect and further reduce the turnoff time, additional lapped regions 13*c*, 13*d* and 13*e* were provided as shown in FIG. 4. Contacts were added to each of these four regions and connected in parallel, and then coupled to the pulse generator lead 31. This arrangement, which in effect extended the area of the ohmic contact to the added gate, allowed higher turnoff currents to be applied and further reduced the turnoff time of the unit.

Figure 5:
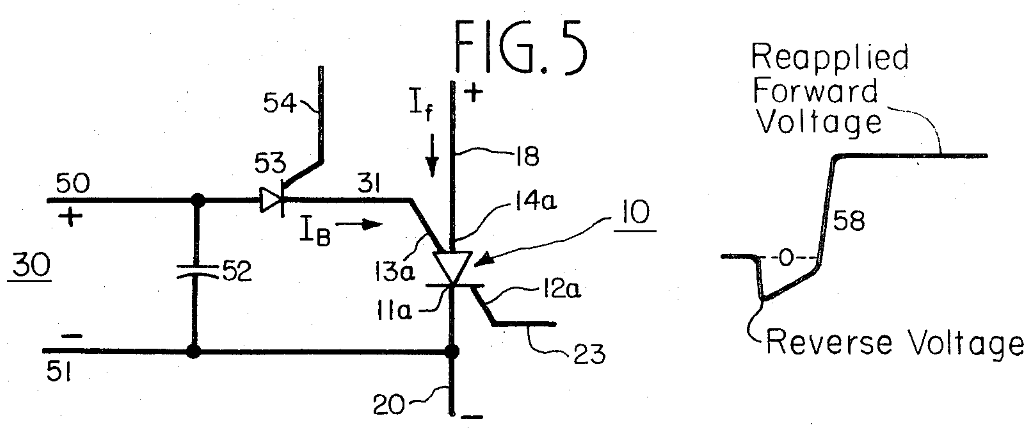
FIG. 5 is a schematic illustration of a test circuit utilized to confirm the advantageous operation of the present invention.

In the left side of FIG. 5 the test arrangement for confirming the reduction in turnoff time of the SCR 10 is illustrated. The output side of pulse generator 30 is shown as including a pair of conductors 50, 51 between which a unidirectional potential difference is applied across capacitor 52. Another trigger SCR is coupled between leads 50 and 31, and a conductor 54 is connected to its gate to facilitate control of SCR 53 to provide a pulse of current $I_B$ over lead 31 to the added gate connection 13*a* of SCR 10. A forward current $I_F$ flows downwardly from reference conductor 18 through SCR 10 and out conductor 20 as illustrated.

Figures 6, 7:
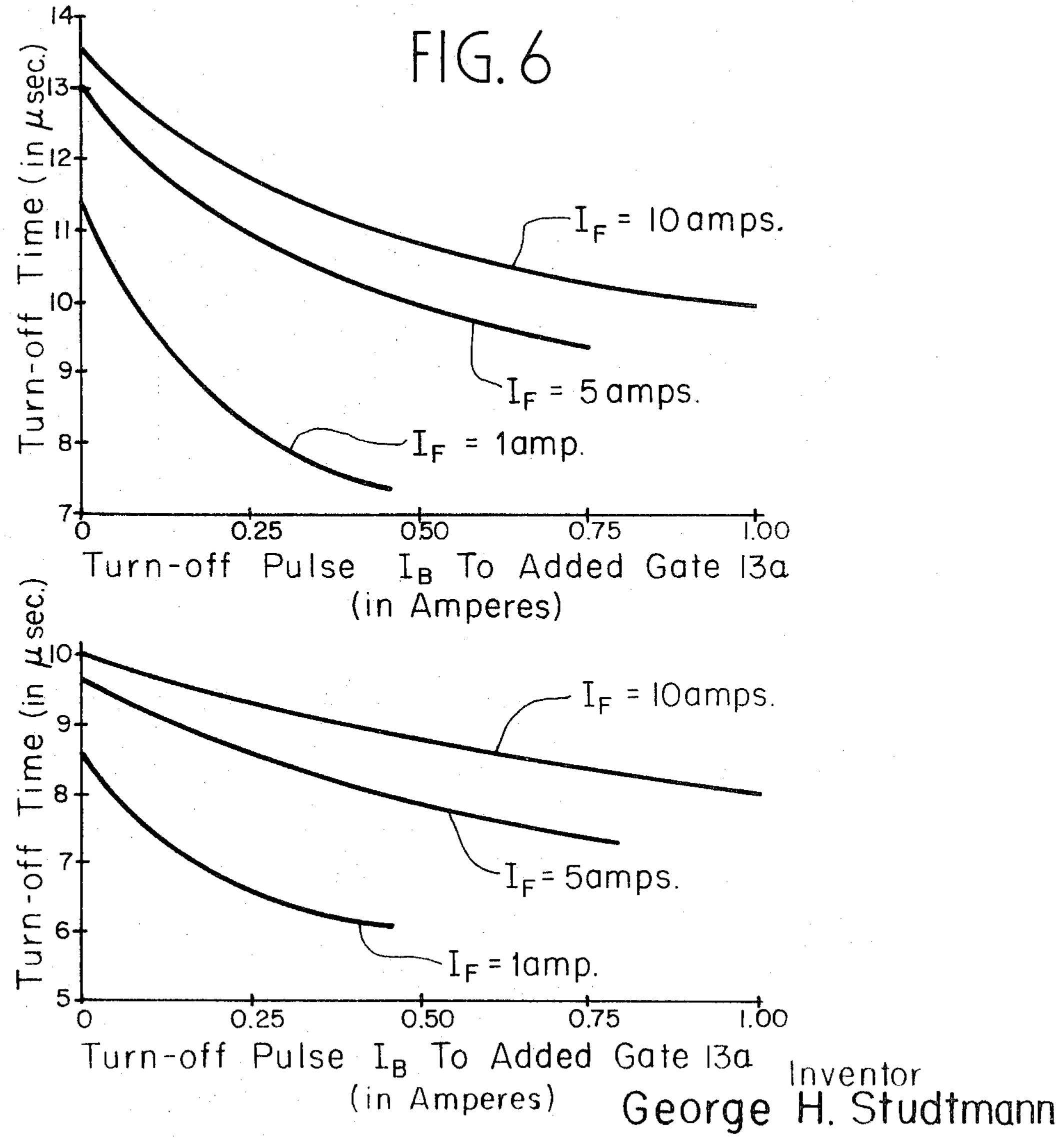
FIGS. 6 and 7 are graphical illustrations of date obtained by the circuit of FIG. 5.

In the right side of FIG. 5 an approximation of the voltage across SCR 10 is illustrated from the time at which the reverse voltage is applied to the anode-cathode connections, until the four-layer device has completely recovered its blocking ability and forward voltage is again applied. FIGS. 6 and 7 illustrate the test data obtained with two different devices modified with the extra gate and controlled from the pulse generator. The tests were conducted with three different levels of forward current $I_F$, 10 amperes, 5 amperes, and 1 ampere. Different levels of the pulse current $I_B$ were provided, and the turnoff time of the SCR was measured to provide the plots set out in FIGS. 6 and 7. These illustrations show that for a given value of forward current, turnoff time is reduced as the value of the pulse current $I_B$ is increased. The turnoff improvement is larger as the ratio $I_B/I_F$ becomes greater.

Instead of modifying a conventional SCR as shows in FIGS. 2–4, the area of the ohmic contact on the added gate can be enlarged or extended by following a production process which makes available an extended area of the N-layer which functions as the added gate. One such process will now be described in connection with FIGS. 8*a*–8*i*.

Figure 8A:
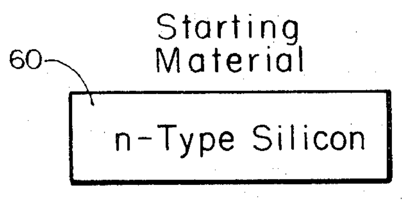
FIGS. 8*a*–8*i* are illustrative showings useful in understanding another method of producing a modified SCR.
Figure 8B:
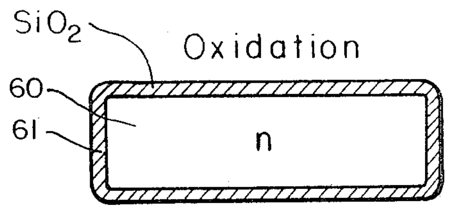
Figure 8C:
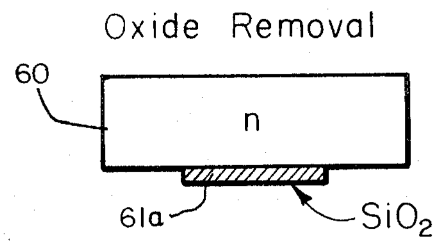

As shown in FIG. 8*a*, the starting material may be a wafer 60 of N-type silicon of monocrystalline structure having a uniform resistivity in the range of 20 to 30 ohm-centimeters and a thickness of about 10 mils. The wafer 60 is heated in an oxidizing ambient such as dry oxygen, wet oxygen, steam, or other oxidizing atmosphere, so as to form a silicon dioxide layer 61 over the whole surface of the wafter as shown in FIG. 8*b*. The oxide layer 61 is then removed except for a selected portion 61*a* on one face of the wafer 60, as shown in FIG. 8*c*. The removal of the oxide layer 61 is accomplished by etching after masking, using any convenient method such as a photolithographic technique. The remaining portion 61*a* of the silicon oxide layer serves as a mask to prevent diffusion of impurity into the underlying silicon 60. The thickness of the silicon dioxide portion 61*a* is chosen so as to provide effective masking during the complete diffusion deposition procedure (typical thickness is 2,000 to 3,000 Angstroms).

Figure 8D:
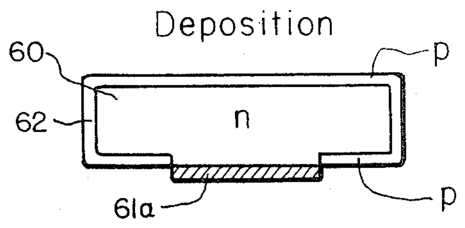
Figure 8E:
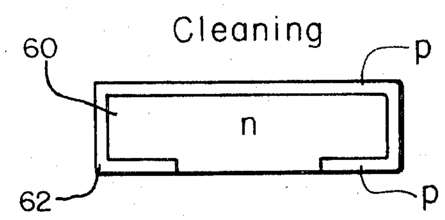
Figure 8F:
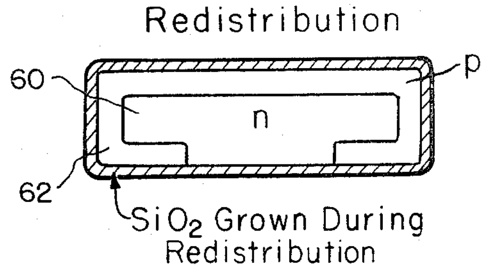
Figure 8G:
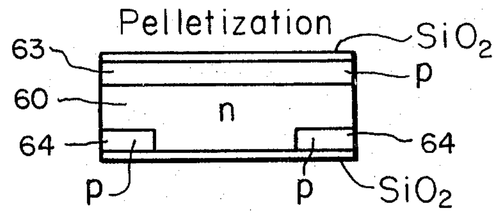
Figure 8H:
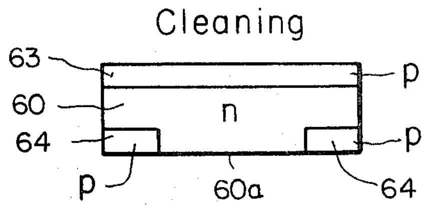
Figure 8I:
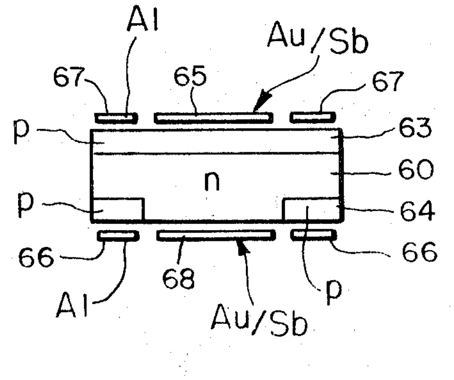

A P-type impurity, such as boron, is then deposited into the silicon wafer as shown in FIG. 8*d* so as to convert the unmasked N-type portions into thin, heavily doped P-type regions 62. Such deposition can be done, for example, using an open-tube diffusion system with boron tribromide as the impurity source, at a temperature of about 1,050° C. for 1 hour. After surface cleaning (FIG. 8*e*) the deposited impurity 62 is then redistributed (FIG. 8*f*) by heating the wafer in an impurity-free atmosphere, so as to provide junction depth and surface concentration compatible with the characteristics of the PNP-section of a controlled rectifier. A surface concentration of $10^{18}$ atoms/cm.$^3$, and a junction depth of about 2 mils, are typical values. The redistribution can be done, for example, at 1,200° C. for 80 hours, or at a higher temperature for a shorter time. Thereafter, the wafer is pelletized (FIG. 8*g*) to the desired configuration using any convenient technique such as etching or sandblasting. This operation leaves a major portion of the N-type silicon material 60 in place, to function as the added gate. The P-type material 62 is separated in a disclike portion 63, to serve as the normal gate, and an annular portion 64, to operate as the anode. The upper and lower silicon dioxide layers are then removed in another cleaning step (FIG. 8*h*), exposing the extended area portion 60*a* of the N-type layer 60.

In order to achieve the PNPN-configuration another region 65 of N-type material (cathode region) is added to the P-diffused region 63 (FIG. 8*i*) by alloying into the region 63 an antimony-containing gold foil 65, for example, containing about 0.6 percent antimony, the remainder being gold. The anode region 64 is contacted by alloying into the partially P-diffused side of the wafer an aluminum/silicon eutectic alloy foil 66 (or aluminum foil, or boron-containing gold foil), shaped so as to cover the P-diffused area 64. Electrical contact is also made to the base regions 63 and 60, using convenient alloy foils. For example, an aluminum foil 67 can be used for the P-base region 63, and an antimony-containing gold foil 68 for the N-base region 60. The foils are shaped so as to cover the desired portion of the P-base 63 on the cathode side of the pellet, and the N-type portion 60*a* on the other side of the pellet which was masked during diffusion. If the shape of these contacts is so intricate as to make difficult the shaping of the contacting foil, an evaporation technique can be used to cover the area to be contacted with the proper metal before alloying.

While only particular embodiments of the invention have been described and illustrated it is manifest that various alterations and modifications may be made therein. It is therefore the invention to provide statutory protection for such variations as may fall with the true spirit and scope of the invention.

What is claimed is:

1. A circuit for energizing and operating a thyristor comprising a body having four alternate layers of N- and P-type semiconductor material, in which the first N-layer has an ohmic contact to function as the cathode, the first P-layer has an ohmic contact to function as the normal gate and forms a first end junction with the first N-layer, the second N-layer includes an ohmic contact enabling it to function as an added gate and forms a center junction with said first P-layer, the second P-layer has an ohmic contact to function as the anode and forms a second end junction with the second N-layer, and in which the thyristor body is generally disc-shaped and is lapped to provide an area for receiving the ohmic contact of the added gate, means including a pair of reference conductors for applying a unidirectional potential difference between the ohmic contacts of the anode and cathode layers with the appropriate polarity to provide anode-cathode current flow through the thyristor responsive to the application of gate signals to the normal gate, a turnoff circuit, coupled to said reference conductors, for at least temporarily overcoming the effect of said unidirectional potential difference to effect turnoff of the thyristor, and means, coupled to the ohmic contact on the added gate of the thyristor, for applying a control signal of the proper polarity to produce current flow across said center junction from said second N-layer into said first P-layer, to sweep out the charge carriers which would otherwise recombine over a longer time period.

2. A circuit as claimed in claim 1 in which at least one additional portion of the thyristor body is lapped for receiving at least one additional ohmic contact for connection with the ohmic contact of the added gate.

3. A circuit as claimed in claim 1 in which three additional portions of the thyristor body are lapped for receiving three additional ohmic contacts for connection with the first ohmic contact of the added gate, thus providing an extended contact area for the added gate.

4. A circuit as claimed in claim 1 in which *n* additional portions of the thyristor body are lapped for receiving *n* additional ohmic contacts for connection with the first ohmic contact of the added gate, thus providing an extended contact area for the added gate.

5. A circuit as claimed in claim 1 in which substantially the entire thyristor body is lapped to provide a substantially circular contact area, and a ring gate ohmic contact is affixed to the extended contact area.

6. A circuit for energizing and operating a thyristor comprising a body having four alternate layers of N- and P-type semiconductor material, in which the first N-layer has an ohmic contact to function as the cathode, the first P-layer has an ohmic contact to function as the normal gate and forms a first end junction with the first N-layer, the second N-layer includes an extended area of ohmic contact provided by producing the PNPN-thyristor with the second N-layer having an extended exposed area for receiving the ohmic contact, enabling it to function as an added gate and forming a center junction with said first P-layer, and the second P-layer has an ohmic contact to function as the anode and forms a second end junction with the second N-layer, means including a pair of reference conductors for applying a unidirectional potential difference between the ohmic contacts of the anode and cathode layers with the appropriate polarity to provide anode-cathode current flow through the thyristor responsive to the application of gate signals to the normal gate, a turnoff circuit, coupled to said reference conductors, for at least temporarily overcoming the effect of said unidirectional potential difference to effect turnoff of the thyristor, and means, coupled to the ohmic contact on the added gate of the thyristor, for applying a control signal of the proper polarity to produce current flow across said center junction from said second N-layer into said first P-layer, to sweep out the charge carriers which would otherwise recombine over a longer time period.

7. A circuit as claimed in claim 6 in which a ring gate ohmic contact is affixed to the extended contact area on the second N-layer of the thyristor body.

8. A thyristor comprising a body having four alternate layers of N- and P-type semiconductor material, a first ohmic contact affixed to the first N-layer to provide a cathode connection, a second ohmic contact affixed to the first P-layer to provide a connection to receive normal gate signals, the first P-layer forming a first end junction with the first N-layer, a third ohmic contact affixed to the second P-layer to provide an anode connection such that a unidirectional potential difference can be applied between the first and third ohmic connections to energize the thyristor, the second P-layer forming a second end junction with the second N-layer, and an extended contact area provided on the second N-layer and a fourth ohmic contact affixed to this extended contact area to enable the second N-layer to function as an added gate, which second N-layer forms a center junction with the first P-layer, such that application of a control signal of the proper polarity produces current flow across said center junction from the second N-layer into the first P-layer, to sweep out the charge carriers which would otherwise recombine over a longer time period when the thyristor is turned off.

9. A thyristor as claimed in claim 8 in which the thyristor body is generally disc-shaped and is lapped in a plurality of areas to provide said extended contact area for receiving the fourth ohmic contact.

10. A thyristor as claimed in claim 8 in which said extended contact area for the added gate is provided by producing the PNPN-thyristor with the second N-layer having an extended exposed area for receiving the fourth ohmic contact.

11. A thyristor comprising a body having four alternate layers of N- and P-type semiconductor material, a first ohmic contact affixed to a first end layer to provide a cathode connection, a second ohmic contact affixed to one of the intermediate layers to provide a connection to receive normal gate signals, a third ohmic contact affixed to the other of the end layers to provide an anode connection such that a unidirectional potential difference can be applied between the first and third ohmic connections to energize the thyristor, and an extended contact area provided on the second of the intermediate layers, and a fourth ohmic contact affixed to this extended contact area to enable the second intermediate layer to function as an added gate, which second intermediate layer forms a center junction with the first intermediate layer, such that application of a control signal of the proper polarity produces current flow across said center junction from the second intermediate layer into the first intermediate layer, to sweep out the charge carriers which would otherwise recombine over a longer time period when the thyristor is turned off.

12. A thyristor as claimed in claim 11 in which the thyristor body is generally disc-shaped and is lapped in a plurality of areas to provide said extended contact area for receiving the fourth ohmic contact.

13. A thyristor as claimed in claim 12 in which said fourth ohmic contact is a ring gate contact affixed to said extended contact area.

14. A thyristor as claimed in claim 11 in which said extended contact area for the added gate is provided by producing the PNPN-thyristor with the second intermediate layer having an extended exposed area for receiving the fourth ohmic contact.

15. A thyristor as claimed in claim 14 in which said fourth ohmic contact is a ring gate contact affixed to said extended exposed area.

16. A thyristor as claimed in claim 11 and further including a circuit for energizing and operating the thyristor, comprising means including a pair of reference conductors for applying a unidirectional potential difference between the ohmic contacts of the anode and cathode layers with the appropriate polarity to provide anode-cathode current flow through the thyristor responsive to the application of gate signals to the normal gate, a turnoff circuit, coupled to said reference conductors, for at least temporarily overcoming the effect of said unidirectional potential difference to effect turnoff of the thyristor, and means, coupled to the fourth ohmic contact on the added gate of the thyristor, for applying a control signal of the proper polarity to produce current flow across said center junction from said second intermediate layer into said first intermediate layer, to sweep out the charge carriers which would otherwise recombine over a longer time period.

* * * * *